United States Patent
Goyal et al.

(10) Patent No.: US 10,239,976 B2
(45) Date of Patent: *Mar. 26, 2019

(54) ETHYLENE COPOLYMERS PRODUCED WITH SINGLE SITE CATALYST

(71) Applicant: NOVA Chemicals (International) S.A., Fribourg (CH)

(72) Inventors: Shivendra Goyal, Calgary (CA); Bronwyn Gillon, Calgary (CA); Stephen Salomons, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/504,341

(22) PCT Filed: Aug. 6, 2015

(86) PCT No.: PCT/IB2015/055989
§ 371 (c)(1),
(2) Date: Feb. 16, 2017

(87) PCT Pub. No.: WO2016/027193
PCT Pub. Date: Feb. 25, 2016

(65) Prior Publication Data
US 2017/0233512 A1     Aug. 17, 2017

Related U.S. Application Data

(60) Provisional application No. 62/038,971, filed on Aug. 19, 2014.

(51) Int. Cl.
| | |
|---|---|
| *B32B 27/06* | (2006.01) |
| *C08F 210/16* | (2006.01) |
| *C08J 5/18* | (2006.01) |
| *C08L 23/06* | (2006.01) |
| *C08L 23/08* | (2006.01) |
| *C08F 210/00* | (2006.01) |
| *C08F 4/659* | (2006.01) |

(52) U.S. Cl.
CPC ............ *C08F 210/16* (2013.01); *B32B 27/06* (2013.01); *C08F 210/00* (2013.01); *C08J 5/18* (2013.01); *C08L 23/06* (2013.01); *C08L 23/0815* (2013.01); *B32B 2307/72* (2013.01); *C08F 4/65908* (2013.01); *C08F 4/65912* (2013.01); *C08F 2420/04* (2013.01); *C08F 2500/26* (2013.01); *C08J 2323/08* (2013.01); *C08L 2203/16* (2013.01); *C08L 2205/025* (2013.01)

(58) Field of Classification Search
CPC ... B32B 27/06; B32B 2307/72; C08F 210/00; C08F 210/16; C08F 2420/04; C08F 2500/26; C08F 4/65908; C08F 4/65912; C08J 5/18; C08J 2323/08; C08L 23/06; C08L 23/0815; C08L 2203/16; C08L 2205/025

See application file for complete search history.

(56) References Cited

U.S. PATENT DOCUMENTS

2004/0086671 A1    5/2004 Brown et al.
2013/0345377 A1*  12/2013 Ker ................... C08F 210/16
                                                          526/147
2014/0100343 A1    4/2014 Ker et al.

FOREIGN PATENT DOCUMENTS

| EP | 2 177 546 A1 | 4/2010 |
|---|---|---|
| WO | 2005/019333 A1 | 3/2005 |
| WO | 2006/113983 A1 | 11/2006 |

OTHER PUBLICATIONS

ASTM D6474-99 (Reapproved 2006)—Standard Test Method for Determining Molecular Weight Distribution and Molecular Weight Averages of Polyolefins by High Temperature Gel Permeation Chromatography; Copyright ASTM International; Current edition approved Mar. 15, 2006. Published Apr. 2006. Originally approved in 1999. Last previous edition approved in 1999 as D6474-99. pp. 1-6.

ASTM D3418-12; Standard Test Method for Transition Temperatures and Enthalpies of Fusion and Crystallization of Polymers by Differential Scanning Calorimetry; Copyright ASTM International; Current edition approved Aug. 1, 2012. Published Sep. 2012. Originally approved in 1975. Last previous edition approved in 2008 as D3418-08. pp. 1-7.

ASTM D792-13; Standard Test Methods for Density and Specific Gravity (Relative Density) of Plastics by Displacement; Current edition approved Nov. 1, 2013. Published Nov. 2013. Originally approved in 1944. Last previous edition approved in 2008 as D792-08. pp. 1-6.

ASTM D 1238-04; Standard Test Method for Melt Flow Rates of Thermoplastics by Extrusion Plastometer; Copyright ASTM International; Current edition approved Mar. 1, 2004. Published Apr. 2004. Originally approved in 1965. Last previous edition approved in 2001 as D 1238-01. pp. 1-13.

(Continued)

*Primary Examiner* — Irina S Zemel
*Assistant Examiner* — Jeffrey S Lenihan
(74) *Attorney, Agent, or Firm* — Julie L. Heinrich (57) ABSTRACT

Embodiments of the invention described herein relate to a polyethylene polymer composition suitable for use in the manufacture of packaging articles, flexible films and/or sheets. In one embodiment, the copolymer comprises a polyethylene resin with density 0.918 g/cm$^3$ to about 0.935 g/cm$^3$, G' at G''$_{(500\ Pa)}$ value, as determined from Dynamic Mechanical Analysis at 190° C., of less than 40 Pa, $M_z/M_w$ of greater than 2, CDBI$_{50}$ of greater than 60. Other embodiments relate to polymer compositions with defined molecular characteristics and formulations suitable for use in the manufacture of articles including films, sheets, bags and pouches with improved creep resistance and high toughness and a good balance of film stiffness and processability in monolayer and/or multi-layer film structures.

28 Claims, 6 Drawing Sheets

(56) References Cited

OTHER PUBLICATIONS

ASTM D3124-98 (Reapproved 2011); Standard Test Method for Vinylidene Unsaturation in Polyethylene by Infrared Spectrophotometry; Copyright ASTM International; Current edition approved Feb. 1, 2011. Published Mar. 2011. Originally approved in 1972. Last previous edition approved in 2003 as D3124-98(2003). pp. 1-4.

ASTM D 1709-04; Standard Test Methods for Impact Resistance of Plastic Film by the Free-Falling Dart Method; Copyright ASTM International; Current edition approved Oct. 1, 2004. Published Oct. 2004. Originally approved in 1959. Last previous edition approved in 2003 as D 1709-03. pp. 1-9.

ASTM D1922-09; Standard Test Method for Propagation Tear Resistance of Plastic Film and Thin Sheeting by Pendulum Method; Copyright ASTM International; Current edition approved May 1, 2009. Published Jun. 2009. Originally approved in 1961. Last previous edition approved in 2008 as D1922-08. pp. 1-7.

ASTM D5748-95 (Reapproved 2012); Standard Test Method for Protrusion Puncture Resistance of Stretch Wrap Film; Copyright ASTM International; Current edition approved Apr. 1, 2012. Published May 2012. Originally approved in 1995. Last previous edition approved in 2007 as D5748-95 (2007). pp. 1-4.

ASTM D882-10; Standard Test Method for Tensile Properties of thin Plastic Sheeting; Copyright ASTM International; Current edition approved Apr. 1, 2010. Published Jun. 2010. Originally approved in 1946. Last previous edition approved in 2009 as D882-09. pp. 1-10.

\* cited by examiner

ETHYLENE COPOLYMERS PRODUCED WITH SINGLE SITE CATALYST

TECHNICAL FIELD

The present disclosure relates to ethylene copolymers, copolymer compositions and methods of making and using the same.

BACKGROUND ART

Packaging films and heavy duty bags/sacks for various commercial and consumer applications may be produced from various polymers and their blends. Such films can be manufactured using either monolayer or co-extrusion processes. Polyethylene resins made with different catalysts, manufacturing technologies and operating conditions provide different molecular characteristics and performance attributes. Commonly used polyethylene resins in the packaging industry are broadly characterized as linear low density polyethylene (LLDPE), medium density polyethylene (MDPE), low density polyethylene (LDPE) and high density polyethylene (HDPE). These types of polyethylene resins and their blends are commonly used to manufacture flexible films, sheets and bags for different needs and applications. In some cases, polypropylene and/or other materials can also blended to modify the end use characteristics, e.g. to increase the stiffness of the heavy duty sack films.

Some performance properties of flexible films include film toughness (dart impact strength), machine and transverse direction (MD and TD) tear strengths, film stiffness (or secant modulus), tensile yield strength, puncture resistance and sealability (seal initiation temperature and maximum seal strength). Creep resistance is another performance attribute useful for heavy duty sacks/bags and for form-fill-seal packaging for various applications, e.g. packaging of resins, fertilizers, cotton, salt, stones, lawn and garden supplies, insulation, building materials, cement, pet foods, flour, seed and feed etc. Furthermore, the film manufacturers prefer good resin processability with reasonable extruder current and pressures, and good bubble stability to achieve higher outputs and plant productivity. In automatic packaging operations, such as form-fill-seal packaging, it is desired to hold the contents of the package without excessive creep or wrinkling especially when the contents of the package are hotter than the film.

Thus, there exists a need for new ethylene copolymer architectures that can provide improved creep resistance and high toughness and a good balance of film stiffness and processability in monolayer and multi-layer film structures.

A need exists for single site catalyzed ethylene copolymers having high film toughness properties that are relatively easy to process or convert into finished product. Furthermore, a need exists for an ethylene copolymer that exhibits high creep resistance and good processability. Although not wishing to be bound by theory, a uniform melting/freezing behavior of an ethylene copolymer (as exhibited by a single peak in the differential scanning calorimeter, DSC, measurement) may help in co-crystallization of different sized polymer molecules without much segregation thereby improving the creep resistance of films. Therefore, a need exists for an ethylene copolymer that has uniform melting behavior, i.e. exhibiting a single peak in a Differential Scanning Calorimeter (DSC) measurement.

DISCLOSURE OF INVENTION

Provided is an ethylene copolymer having a) a density from about 0.918 g/cm$^3$ to about 0.935 g/cm$^3$, b) G' at G"$_{(500\ Pa)}$ value, as determined from Dynamic Mechanical Analysis at 190° C., of less than 40 Pa, c) a molecular weight distribution $M_z/M_w$ of greater than 2, provided that when the $M_z/M_w$ is greater than 3, the copolymer further has a normal to flat comonomer distribution, and d) a CDBI$_{50}$ of greater than 65.

Provided is an ethylene copolymer having a) a density from about 0.918 g/cm$^3$ to about 0.935 g/cm$^3$, b) G' at G"$_{(500\ Pa)}$ value, as determined from Dynamic Mechanical Analysis at 190° C., of less than 40 Pa, c) a molecular weight distribution $M/M_w$ of greater than 2, provided that when the $M_z/M_w$ is greater than 3, the copolymer further has a normal to flat comonomer distribution, d) a CDBI$_{50}$ of greater than 60, and e) a single peak in a DSC measurement.

Also provided is an ethylene copolymer having a) a density from about 0.918 g/cm$^3$ to about 0.935 g/cm$^3$, b) G' at G"$_{(500\ Pa)}$ value, as determined from Dynamic Mechanical Analysis at 190° C., of less than 40 Pa, c) a molecular weight distribution $M_z/M_w$ from about 2 to about 3, d) a CDBI$_{50}$ of greater than 60, and e) a single peak in a DSC measurement.

Also provided is an ethylene copolymer having a) a density from about 0.918 g/cm$^3$ to about 0.935 g/cm$^3$, b) G' at G"$_{(500\ Pa)}$ value, as determined from Dynamic Mechanical Analysis at 190° C., of less than 40 Pa, c) a molecular weight distribution $M_z/M_w$ of greater than 3, d) a normal to flat comonomer distribution, e) a CDBI$_{50}$ of greater than 60, and f) a single peak in a DSC measurement.

Also provided are ethylene copolymers as described herein made from ethylene and one or more C$_{3-12}$ alpha olefin comonomers in a continuous polymerization process.

Also provided are polymer compositions comprising the ethylene copolymers described herein. In some embodiments the ethylene copolymers and the polymer compositions may be blended with a high pressure LDPE, a LLDPE, a HDPE, a very low density polyethylene (VLDPE), or an ultra low density polyethylene (ULDPE).

Also provided are films, monolayer and multilayer films, comprising the ethylene copolymers described herein and/or polymer compositions made therefrom.

Also provided are plastic articles, including packaging articles, comprising the ethylene copolymers described herein and/or polymer compositions made therefrom.

BEST MODE FOR CARRYING OUT THE INVENTION

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

Some known polyethylene (LLDPE and MDPE) resins for film packaging have unsatisfactory balance of film toughness, stiffness, processability and creep resistance. Various attempts have been made to improve the stiffness/toughness balance of films from such resins and/or to improve the processability by choosing different polyethylene resins and their blends. For example, choosing a higher density polyethylene or blending LLDPE with HDPE increases film stiffness, but its toughness and sealability characteristics are compromised. Choosing a lower density polyethylene resin improves film toughness, but such films have lower stiffness, creep resistance and tensile strength. The metallocene catalyzed narrow molecular weight distribution LLDPE/MDPE resins can provide high film toughness (dart impact strength) and film stiffness, but lack in tear strength and processability. On the other hand, Ziegler-Natta (ZN) catalyzed LLDPE resins can provide improved processability and good film stiffness, but they exhibit lower film toughness compared to the metallocene catalyzed resins of relatively similar melt index and density. There have been other attempts in the past to employ dual catalyst systems to improve toughness/stiffness balance and resin processability by developing different molecular architectures of polyethylene. However, such resins exhibit unsatisfactory creep performance in field operations.

Provided herein are ethylene copolymers, and polymer compositions made therefrom, that demonstrate improved creep resistance and high toughness and a good balance of film stiffness and processability. Also disclosed are the polymerization process conditions and catalysts used to make these compositions.

Provided is an ethylene copolymer having a) a density from about 0.918 g/cm$^3$ to about 0.935 g/cm$^3$, b) G' at G"$_{(500\ Pa)}$ value, as determined from Dynamic Mechanical Analysis at 190° C., of less than 40 Pa, c) a molecular weight distribution $M_z/M_w$ of greater than 2, provided that when the $M_x/M_w$ is greater than 3, the copolymer further has a normal to flat comonomer distribution, and d) a CDBI$_{50}$ of greater than 65. In some embodiments, the ethylene copolymers described herein have a bimodal or multimodal peak in the DSC curve or measurement.

In some embodiments the ethylene copolymers described herein are made using a polymerization catalyst that is not a Ziegler Natta catalyst. In some embodiments, the ethylene copolymers described herein are made using a polymerization catalyst that contains less than 50%, or less than 25%, or less than 10% or less than 5%, or less than 1% of a Zeigler Natta type catalyst. In other embodiments, the ethylene copolymers are made using a single site catalyst. In other embodiments, the ethylene copolymers are made using a metallocene catalyst.

Provided is an ethylene copolymer having a) a density from about 0.918 g/cm$^3$ to about 0.935 g/cm$^3$, b) G' at G"$_{(500\ Pa)}$ value, as determined from Dynamic Mechanical Analysis at 190° C., of less than 40 Pa, c) a molecular weight distribution $M_z/M_w$ of greater than 2, provided that when the $M_z/M_w$ is greater than 3, the copolymer further has a normal to flat comonomer distribution, d) a CDBI$_{50}$ of greater than 60, and e) a single peak in a DSC measurement.

Also provided is an ethylene copolymer having a) a density from about 0.918 g/cm$^3$ to about 0.935 g/cm$^3$, b) G' at G"$_{(500\ Pa)}$ value, as determined from Dynamic Mechanical Analysis at 190° C., of less than 40 Pa, c) a molecular weight distribution $M_z/M_w$ from about 2 to about 3, and d) a CDBI$_{50}$ of greater than 60. In some embodiments the ethylene copolymer also a single peak in a DSC measurement. In some embodiments the ethylene copolymer has more than one single peak in a DSC measurement.

Also provided is an ethylene copolymer having a) a density from about 0.918 g/cm$^3$ to about 0.935 g/cm$^3$, b) G' at G"$_{(500\ Pa)}$ value, as determined from Dynamic Mechanical Analysis at 190° C., of less than 40 Pa, c) a molecular weight distribution $M/M_w$ of greater than 3, d) a normal to flat comonomer distribution, and e) a CDBI$_{50}$ of greater than 60. In some embodiments the ethylene copolymer also a single peak in a DSC measurement. In some embodiments the ethylene copolymer has more than one single peak in a DSC measurement.

In some embodiments the ethylene copolymers described herein have a melt index, I2, from about 0.4 g/10 min to about 10 g/10 min, or from about 0.4 g/10 min to about 5 g/10 min, or from about 0.5 g/10 min to about 2 g/10 min, or from about 5 g/10 min to about 10 g/10 min.

In some embodiments the ethylene copolymers described herein have a density from about 0.918 g/cm$^3$ to about 0.930 g/cm$^3$, or from about 0.919 g/cm$^3$ to about 0.927 g/cm$^3$. In some embodiments the ethylene copolymers described here in have a density from about 0.918 g/cm$^3$ to about 0.925 g/cm$^3$, or from about 0.925 g/cm$^3$ to about 0.935 g/cm$^3$.

In some embodiments the ethylene copolymers described herein have a G' at G"$_{(500\ Pa)}$ value (at 190° C.) of less than 35 Pa. In some embodiments the ethylene copolymers described herein have a G' at G"$_{(500\ Pa)}$ value (at 190° C.) of less than 30 Pa.

In some embodiments, the $M_z/M_w$ of the ethylene copolymer, or polymer composition made therefrom, is from about 2.0 and to about 2.5, or is from about 2.5 and to about 2.8, or is from about 2.5 and to about 3, or is from about 2.1 and to about 2.8.

In some embodiments, when the $M_z/M_w$ of the ethylene copolymer, or polymer composition made therefrom, is from about 2 to about 3, the ethylene copolymer or composition exhibits a reverse comonomer distribution, or it exhibits a normal comonomer distribution, or it exhibits a flat comonomer distribution.

In some embodiments, when the $M_z/M_w$ of the ethylene copolymer, or polymer composition made therefrom, is from about 2 to about 3, the ethylene copolymer or composition exhibits a flat to reverse comonomer distribution.

In some embodiments the ethylene copolymers described herein have an $M_w/M_n$ from about 2.1 to about 5.5. In some embodiments the ethylene copolymers described herein have an $M_w/M_n$ from about 2.2 to about 4.5. In some embodiments the ethylene copolymers described herein have an $M_w/M_n$ from about 2.3 to about 3.8.

In other embodiments, the $M_z/M_w$ of the ethylene copolymer, or polymer composition made therefrom, is from 3 to about 6, or from 3 to about 5, or from 3 to about 4, or from 3 to about 3.5, and has a comonomer distribution of the ethylene copolymer, or polymer composition made therefrom, that is normal to flat.

Ethylene copolymers may have a unimodal, broad unimodal, bimodal, or multimodal profile in a gel permeation chromatography (GPC) curve generated according to the method of ASTM D6474-99.

As used herein, "unimodal" means that there is not more than one distinguishable peak in the GPC curve measured according to the method of ASTM D6474-99. Unimodal includes a peak in the GPC curve, where there is only one peak. Unimodal also includes GPC traces containing shoulders, or buried peaks, that cannot be easily separated, or deconvoluted into well-defined unique peaks. Bimodal GPC traces comprise curves when there is a local extremum between peaks, and the peaks can be separated or deconvoluted. Alternatively, the term "bimodal" connotes the presence of two maxima (which may be equal, or may have one local and one global maximum) in a molecular weight distribution curve generated according to the method of ASTM D6474-99. The term "multi-modal" denotes the presence of two or more maxima (again, these maxima likely have a single global maximum, but there could be more than one equal peak) in a molecular weight distribution curve generated according to the method of ASTM D6474-99.

In an embodiment of the invention, the ethylene copolymer will have a unimodal profile in a gel permeation chromatography (GPC) curve generated according to the method of ASTM D6474-99.

In an embodiment of the invention, the ethylene copolymer will have a unimodal profile with a shoulder or buried peak in a gel permeation chromatography (GPC) curve generated according to the method of ASTM D6474-99.

In an embodiment of the invention, the ethylene copolymer will have a bimodal profile in a gel permeation chromatography (GPC) curve generated according to the method of ASTM D6474-99.

In an embodiment of the invention, the ethylene copolymer will have a multimodal profile in a gel permeation chromatography (GPC) curve generated according to the method of ASTM D6474-99.

The number of short chain branches per 1000 carbon atoms, is measured relative to the copolymer fractions of different molecular weights. When plotted on a semi-logarithmic scale graph, the sloping line (from low molecular weight fractions to high molecular weight fractions on the logarithmic horizontal x-axis and the number of short chain branches on the vertical y-axis) is the short chain branching distribution determined by Fourier Transform Infra-Red (FTIR) spectrometry for the different molecular weight fractions. For an upwardly sloping line, the number of short chain branches increases with an increase of the molecular weight, and hence the comonomer incorporation is said to be "reversed". For a downwardly sloping line, the number of short chain branches decreases with an increase of the molecular weight, and hence the comonomer incorporation is said to be "normal". For a flat line, the number of short chain branches remains relatively constant with an increase of the molecular weight, and hence the comonomer incorporation is said to be "flat". It can be difficult to determine the short chain branching distribution accurately by FTIR at lower molecular weights than $M_n$ and at higher molecular weights than $M_w$ due to low concentration of polymer chains in the solution. In this disclosure, flat comonomer distribution means that the number of short chain branches per 1000 carbon atoms determined at $M_n$ and at $M_w$ are within 5% of one another.

The phrase "reverse comonomer incorporation" also means that on deconvolution of the GPC-FTIR (or TREF) data profiles, using molecular weight distribution segments of not less than 10,000 Da, there is one or more higher molecular weight component having a higher comonomer incorporation than the comonomer incorporation in one or more lower molecular weight segments.

In some embodiments, the ethylene copolymers and/or the polymer compositions made therefrom have a $CDBI_{50}$ greater than 60. In some embodiments the $CDBI_{50}$ is from about 60 to about 98, or from about 70 to about 98, or from about 70 to about 95. In other embodiments the $CDBI_{50}$ is from about 65 to about 95. In other embodiments the $CDBI_{50}$ is greater than 70.

Figure 1:
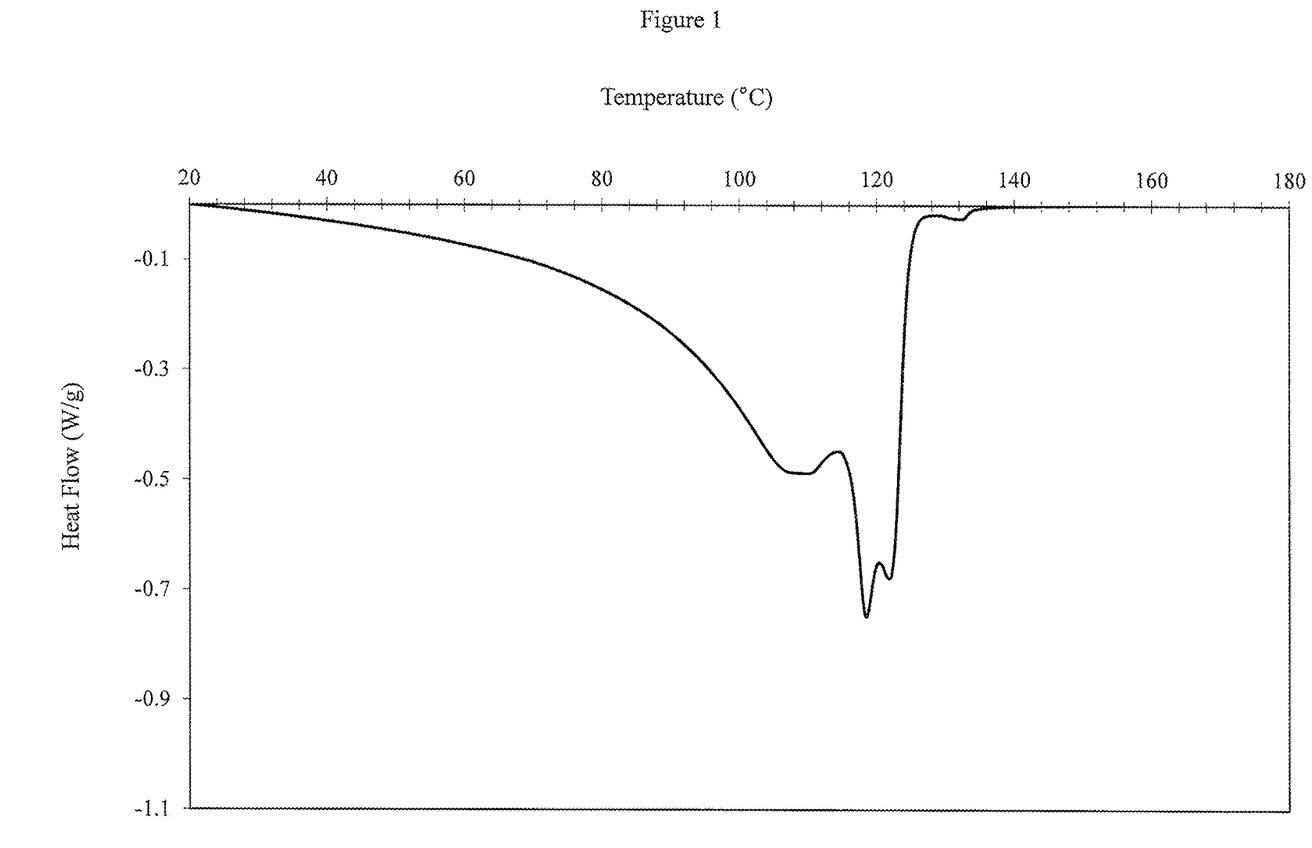
FIG. 1: DSC Profile Measurements for DOWLEX™ 2045G
Figure 2:
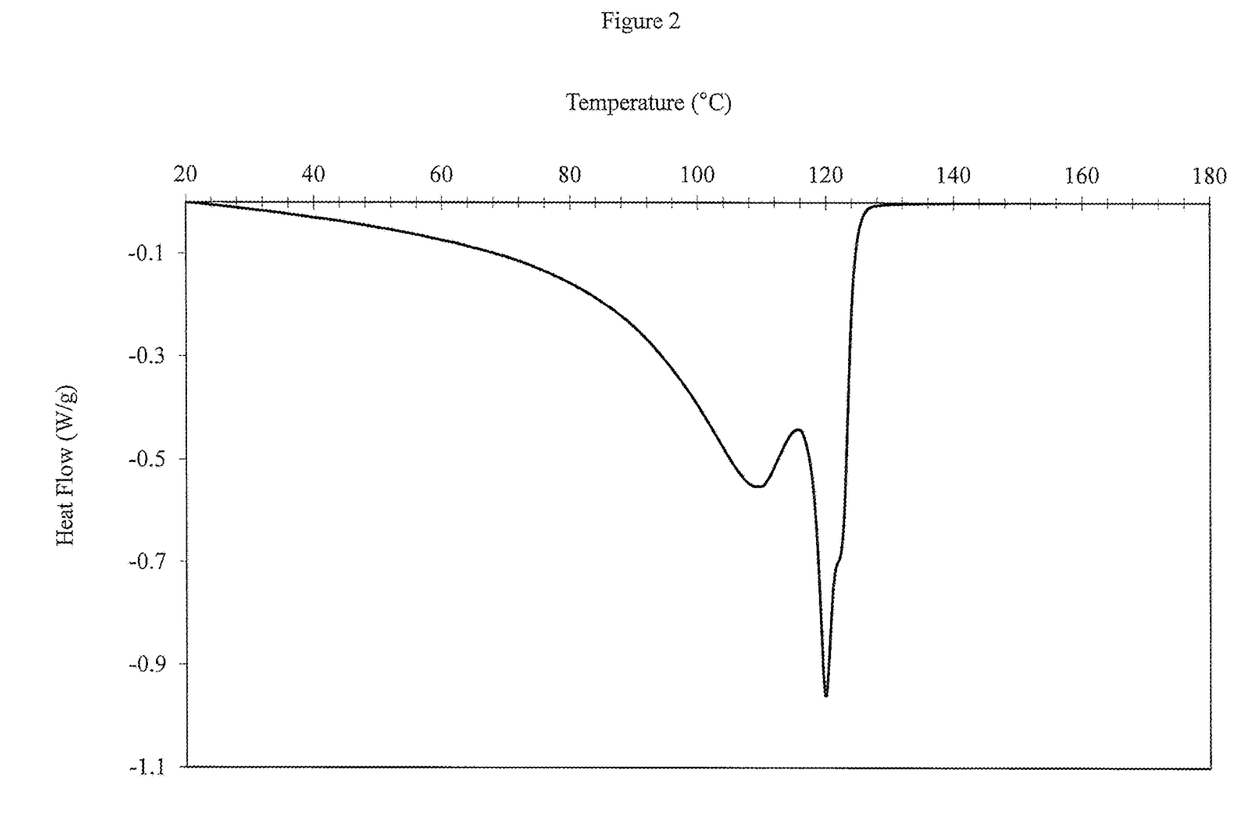
FIG. 2: DSC Profile Measurements for SCLAIR® FP120-C
Figure 3:
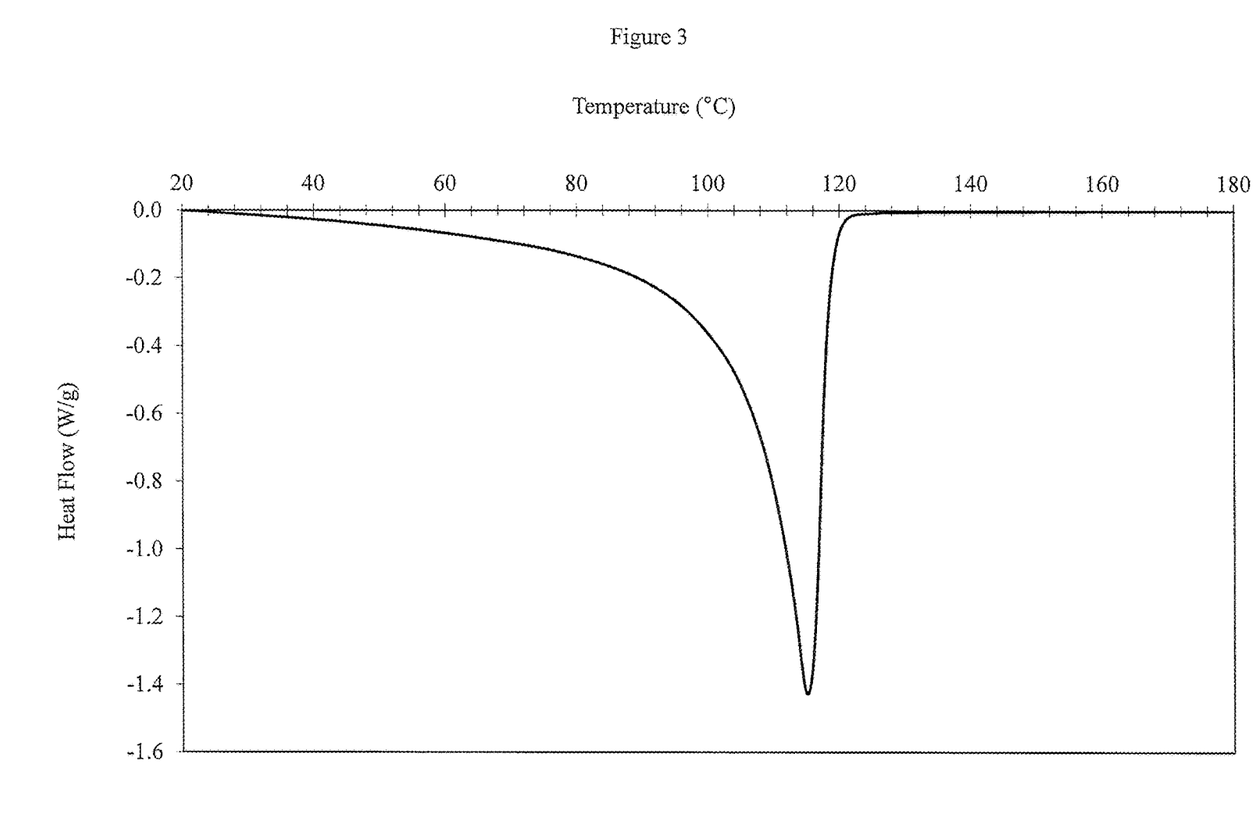
FIG. 3: DSC Profile Measurements for EX1
Figure 4:
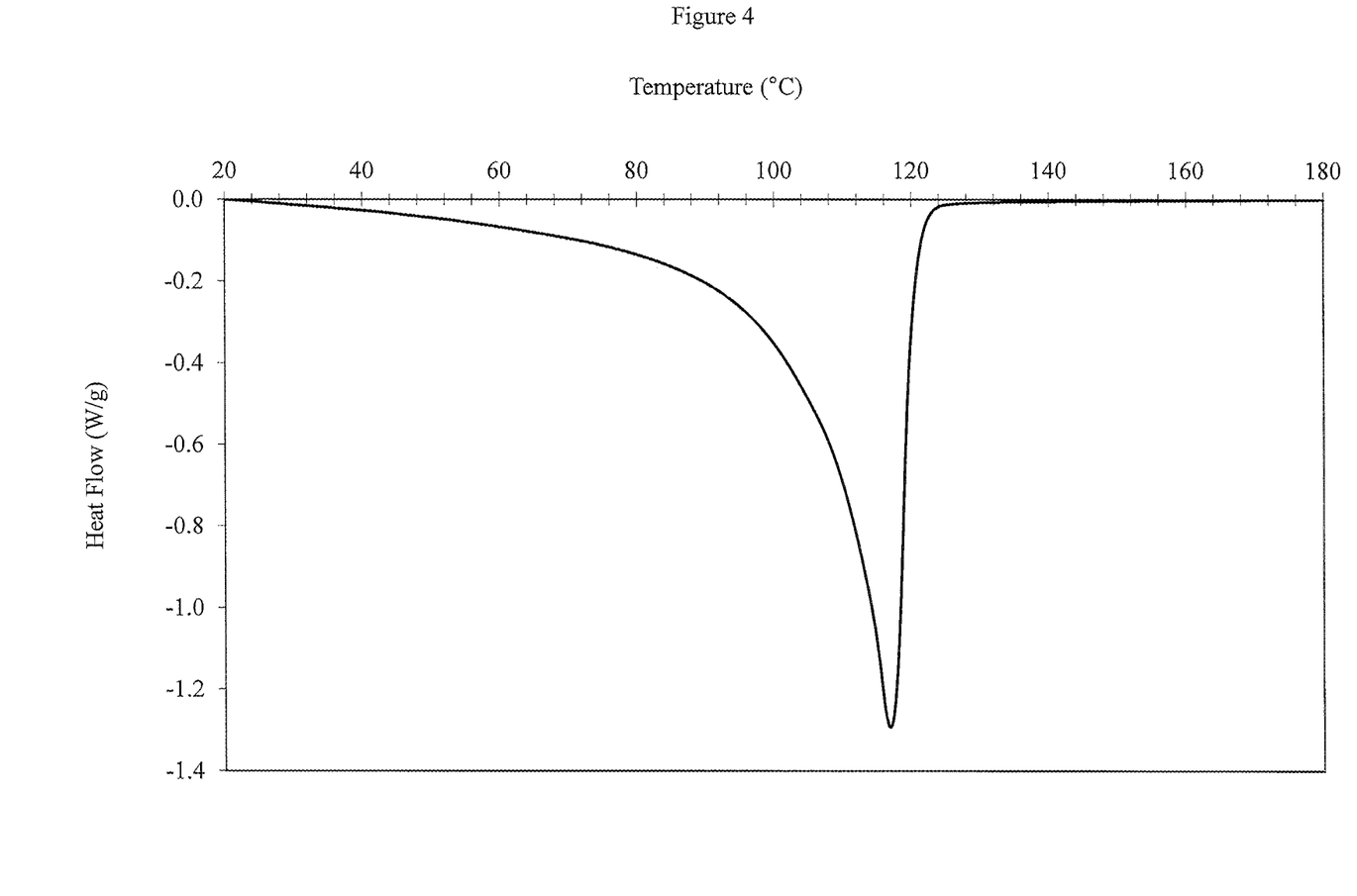
FIG. 4: DSC Profile Measurements for EX2
Figure 5:
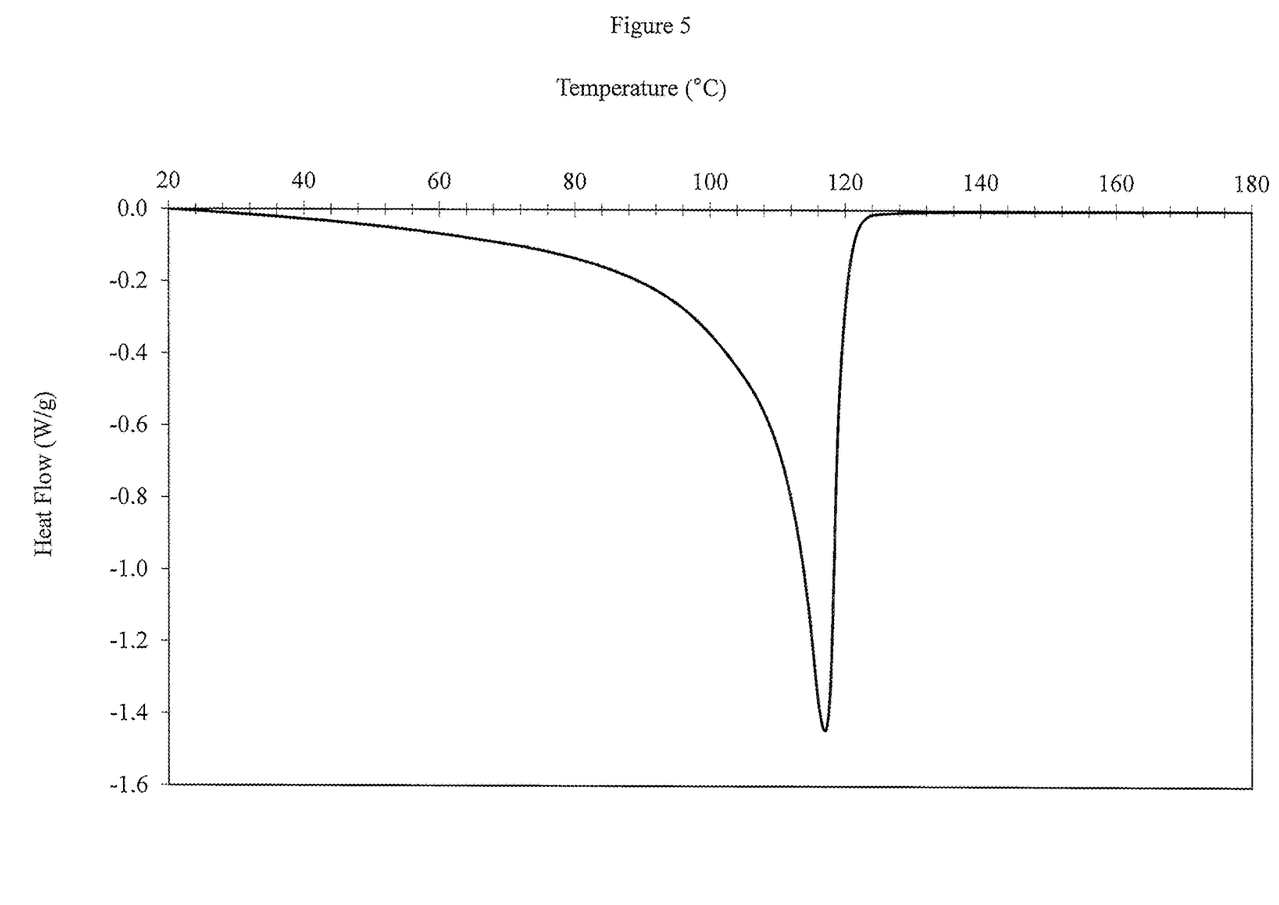
FIG. 5: DSC Profile Measurements for EX3
Figure 6:
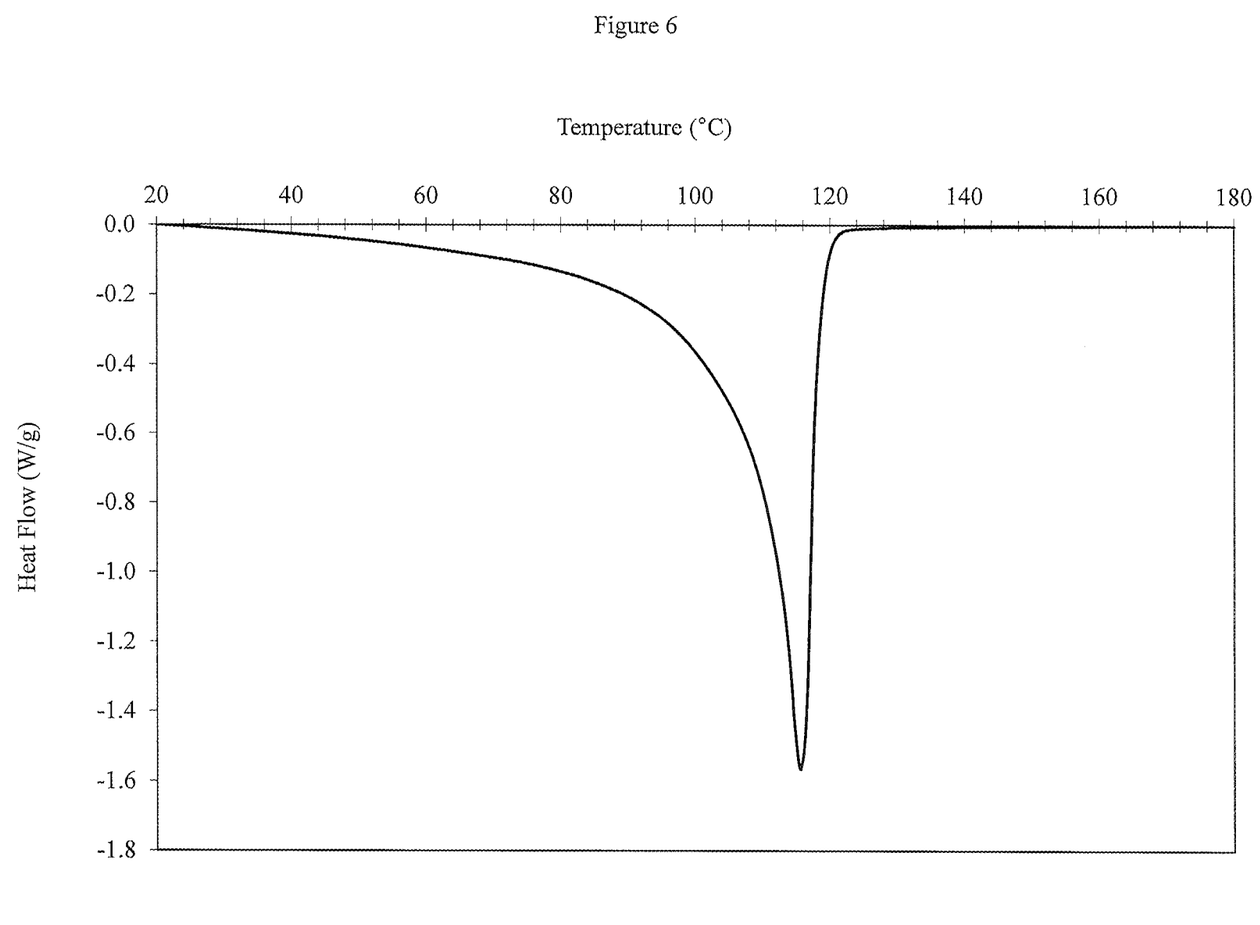
FIG. 6: DSC Profile Measurements for EX4

In some embodiments, the polymers disclosed herein have a single peak in the DSC measurement when measured using ASTM D3418-12. This method includes heating, annealing, cooling and reheating to remove residual stresses in the sample. As used herein, "a single peak" means that there is not more than one distinguishable peak in the DSC profile (as determined using DSC measurement at a ramp rate of 10° C./min). A single peak includes a peak in the DSC curve, where there is only one peak. The single peak also includes DSC melting curves containing shoulders that cannot be easily separated, or deconvoluted into well-defined unique peaks. FIGS. 1 and 2 (comparative examples) illustrate representative more than one peak in the DSC profiles. In these figures, there is one or more local extremum between the peaks, and the peaks can be separated or deconvoluted. Often, a DSC profile with more than one peak is characterized as having an identifiable low melting component and an identifiable high melting component. In contrast, FIGS. 3, 4, 5 and 6 (inventive examples) illustrate representative single peaks in the DSC profiles. These examples include a single peak. While no specific figure is included, also contemplated are embodiments of the polymers disclosed herein that have a bimodal or a multimodal peak in the DSC measurement when measured using ASTM D3418-12 and the methods described herein.

In some embodiments, provided are ethylene copolymers made from ethylene and one or more $C_{3-12}$ alpha olefin comonomers, or one or more $C_{4-10}$ alpha olefin comonomers, in a polymerization process using at least one single site catalyst.

In one embodiment, the single-site catalyst is selected from a catalyst of the formula:

wherein M is a group 4 metal;
PI is a phosphinimine ligand;
L is a monoanionic ligand selected from the group consisting of a cyclopentadienyl-type ligand;

Y is an activatable ligand;
m is 1 or 2;
n is 0 or 1; and
p is an integer and the sum of m+n+p equals the valence state of M.

In some embodiments, the ethylene copolymers are prepared in the presence of a phosphinimine catalyst of the formula:

wherein M is a group 4 metal, for example a metal selected from the group Ti, Zr, and Hf, (in one embodiment, M is Ti); PI is a phosphinimine ligand; L is a monoanionic ligand selected from the group consisting of a cyclopentadienyl-type ligand; Y is an activatable ligand; m is 1 or 2; n is 0 or 1; and p is an integer and the sum of m+n+p equals the valence state of M.

The phosphinimine ligand has the formula $((R^{21})_3P=N)$— wherein each $R^{21}$ is independently selected $C_{3-6}$ alkyl radicals. For example, $R^{21}$ is a t-butyl radical.

L is a 5-membered carbon ring having delocalized bonding within the ring and bound to the metal atom through $\eta^5$ bonds and said ligand being unsubstituted or up to fully substituted with one or more substituents selected from $C_{1-10}$ hydrocarbyl radicals which hydrocarbyl substituents are unsubstituted or further substituted by one or more substituents selected from a halogen atom and a $C_{1-8}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from hydrogen, a $C_{1-8}$ alkyl or alkoxy radical, and $C_{6-10}$ aryl or aryloxy radicals; and germanyl radicals of the formula Ge—$(R)_3$ wherein R is as defined above. For example, the cyclopentadienyl type ligand is selected from a cyclopentadienyl radical, an indenyl radical and a fluorenyl radical.

Y is selected from a hydrogen atom; a halogen atom, a $C_{1-10}$ hydrocarbyl radical; a $C_{1-10}$ alkoxy radical; a $C_{5-10}$ aryl oxide radical; each of which said hydrocarbyl, alkoxy, and aryl oxide radicals may be unsubstituted or further substituted by one or more substituents selected from a halogen atom; a $C_{1-8}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. For example, Y is selected from a hydrogen atom, a chlorine atom and a $C_{1-4}$ alkyl radical.

In some embodiments, the catalysts used to make the polymers may be activated with a co-catalyst selected from:

an aluminoxane compound of the formula $R^{12}_2AlO(R^{12}AlO)_mAlR^{12}_2$ wherein each $R^{12}$ is independently selected from $C_{1-20}$ hydrocarbyl radicals and m is from 3 to 50, and optionally a hindered phenol to provide a molar ratio of Al:hindered phenol from 2:1 to 5:1 if the hindered phenol is present;

an ionic activator that may be selected from:
compounds of the formula $[R^{13}]^+[B(R^{14})_4]^-$ wherein B is a boron atom, $R^{13}$ is a cyclic $C_{5-7}$ aromatic cation or a triphenyl methyl cation and each $R^{14}$ is independently selected from phenyl radicals which are unsubstituted or substituted with 3 to 5 substituents selected from a fluorine atom; a $C_{1-4}$ alkyl radical which is unsubstituted or substituted by a fluorine atom; a $C_{1-4}$ alkoxy radical which is unsubstituted or substituted by a fluorine atom; and a silyl radical of the formula —Si—$(R^{15})_3$; wherein each $R^{15}$ is independently selected from a hydrogen atom and a $C_{1-4}$ alkyl radical; and compounds of the formula $[(R^{18})_tZH]^+[B(R^{14})_4]^-$ wherein B is a boron atom, H is a hydrogen atom, Z is a nitrogen atom or phosphorus atom, t is 2 or 3 and $R^{18}$ is selected from $C_{1-8}$ alkyl radicals, a phenyl radical which is unsubstituted or substituted by up to three $C_{1-4}$ alkyl radicals; or one $R^{18}$ taken together with the nitrogen atom may form an anilinium radical and $R^{14}$ is as defined above; and compounds of the formula $B(R^{14})_3$ wherein $R^{14}$ is as defined above; and mixtures thereof.

An aluminoxane (co-catalyst) and the ionic activator (co-catalyst) may be used separately (e.g. MAO in the first or second reactor and ionic activator in the second or first reactor, or MAO in both reactors or ionic activator in both reactors) or together (e.g. a mixed co-catalyst: MAO and ionic activators in the same reactor (i.e. the first and second reactor)). In one embodiment in the first reactor (e.g. the cold reactor) the co-catalyst could comprise predominantly (e.g. >50 weight % of the co-catalyst) an aluminoxane co-catalyst. The co-catalyst in the cold reactor may also comprise a lesser amount (e.g. <50 weight % of the co-catalyst) of an ionic activator as described above. In this embodiment in the second reactor (e.g. the hot reactor) the activator may comprise a predominant (e.g. >50 weight % of the co-catalyst) amount of an ionic activator. The co-catalyst in the hot reactor may also comprise a lesser amount (e.g. <50 weight % of the co-catalyst) of an aluminum based co-catalyst (activator) noted above. In second embodiment the co-catalysts could be the reverse of the above (e.g. predominantly ionic activator in the first reactor and predominantly aluminum based co-catalyst in the second reactor). In another embodiment the co-catalyst could comprise predominantly an aluminoxane co-catalyst in both reactors (e.g. the first and the second reactor). The co-catalyst in the both reactors may also comprise a lesser amount (e.g. <50 weight % of the co-catalyst) of an ionic activator as described above.

In one embodiment, provided is an ethylene copolymer made from ethylene and one or more $C_{3-12}$ alpha olefin comonomers in a continuous polymerization process. In another embodiment, the ethylene copolymer is made from ethylene and one or more $C_{4-10}$ alpha olefin comonomers in a continuous polymerization process. In some embodiments, the continuous solution polymerization process comprises at least two polymerization reactors.

In some embodiments, the continuous solution polymerization process comprises a first stirred tank polymerization reactor having a mean reactor temperature of from about 100° C. to about 140° C., and, a second stirred tank reactor having a mean temperature of at least about 20° C. greater than the mean reactor temperature of the first reactor.

In some embodiments, the first stirred tank polymerization reactor has a mean reactor temperature of from about 120° C. to about 138° C., or the first stirred tank polymerization reactor has a mean reactor temperature of from about 130° C. to about 137° C.

In some embodiments at least one of the reactors contains a single-site catalyst.

In some embodiments the single-site catalyst is present in the first stirred tank.

Solution processes for the (co)polymerization of ethylene are well known in the art. These processes are conducted in the presence of an inert hydrocarbon solvent, for example, a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha and mixtures thereof. An example of a suitable solvent which is commercially available is "Isopar E" ($C_{5-12}$ aliphatic solvent, ExxonMobil Chemical Company).

The solution polymerization processes may use two or more polymerization reactors. The first polymerization reactor may operate at a lower temperature ("cold reactor") using a "phosphinimine catalyst" described in above. In an embodiment, the polymerization temperature in the first reactor is from about 80° C. to about 140° C. and the hot reactor is operated, for example, at a higher temperature (up to about 220° C.). In another embodiment, the reaction process is a "medium pressure process", meaning that the pressure in each reactor may be up to about 6,000 psi (about 42,000 kilopascals or kPa), or from about 2,000 psi to about 3,000 psi (about 14,000 to about 22,000 kPa). In other embodiments, the pressure may be about 725 psi to about 3,000 psi (about 5,000 kPa to 22,000 kPa).

Suitable monomers for copolymerization with ethylene include $C_{3-20}$ mono- and di-olefins. Example comonomers include $C_{3-12}$ alpha olefins which are unsubstituted or substituted by up to two $C_{1-4}$ alkyl radicals, $C_{5-12}$ vinyl aromatic monomers which are unsubstituted or substituted by up to two substituents selected from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In one embodiment, the ethylene copolymers may comprise not less than about 70, or not less than about 75 weight % of ethylene and the balance of one or more $C_{4-10}$ alpha olefins. In some embodiments the $C_{4-10}$ alpha olefins are selected from 1-butene, 1-hexene and 1-octene. In another embodiment, the $C_{4-10}$ alpha olefin may be present in an amount less than 30 weight %, or less than 20 weight %.

In some embodiments the copolymer or polymer compositions described herein may be, co- and ter-polymers of ethylene, $C_{3-10}$ alpha olefins, and optionally one or more diene monomers. Generally, such polymers will contain from about 70 to about 99 weight % ethylene, or from about 70 to about 95 weight % ethylene and correspondingly from 30 to 1 weight % or 30 to 5 weight % of a mixture of comonomers from $C_{3-10}$ alpha olefins or dienes. Illustrative non-limiting examples of such dienes are one or more of dicyclopentadiene, 1,4-hexadiene, 5-methylene-2-norbornene, 5-ethylidene-2-norbornene and 5-vinyl-2-norbornene.

The monomers may be dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) may be treated in a similar manner.

The feedstock may be heated or cooled prior to feeding to the first reactor. Additional monomers and solvent, which may optionally be heated or cooled, may be added to the second reactor.

The catalyst components may be premixed in the solvent for the reaction or fed as separate streams to each reactor. In some instances premixing may be desirable to provide a reaction time for the catalyst components prior to entering the reaction. Such an "in line mixing" technique is known in the art.

The residence time in each reactor will depend on the design and the capacity of the reactor. The reactors may be operated under conditions to achieve a thorough mixing of the reactants. In some embodiments the reaction can be carried out using two reactors in series or in parallel. From about 20 to about 60 weight % of the final polymer is polymerized in the first reactor, with the balance being polymerized in the second reactor. On leaving the reactor system the non-reactive components may be removed and the resulting polymer may be finished in a conventional manner.

In some embodiments, the first polymerization reactor has a smaller volume than the second polymerization reactor. In some embodiments, the ethylene copolymers produced under these conditions have a combination of desirable properties. For example, the ethylene-octene type ethylene copolymers illustrated in the following examples have excellent dart impact strength and puncture resistance, (which are typically associated with ethylene copolymers prepared using metallocene catalysts) and exhibit good processability (often associated with ethylene copolymers produced using conventional Ziegler Natta catalysts). In addition, the ethylene copolymers illustrated in the following examples have homogeneous melting behaviors exhibiting a single melting peak in the DSC profiles. In some embodiments that display this combination of desirable properties in the final ethylene copolymers, the first reactor in the solution process was operated below 140° C. Table 1 provides the reaction conditions including reactor 1 average temperatures for the four inventive copolymer examples.

In some embodiments, the polymer compositions comprising the ethylene copolymers described herein above have an average total unsaturation per chain from about 0.2 to less than about 2 as determined by FTIR analysis.

Also provided are polymer compositions comprising the ethylene copolymers described herein above. The polymer compositions may further comprise additives, colorants, anti-aging agents, antioxidants, polymer process aides and the like commonly known in the art. In some embodiments, thermoplastic additives may also be used. These additives can be added during the polymerization process or during the extrusion process used to create the polymer resin. In other embodiments, additives can be introduced using a dry blend or during a hot blend or melt extrusion process commonly known in the art.

Also provided are polymer compositions comprising a mixture of the copolymers described herein blended with another high pressure low density polyethylene (LDPE), a high density polyethylene (HDPE), a linear low density polyethylene (LLDPE) or a very low density polyethylene (VLDPE) or an ultra low density polyethylene (ULDPE) and the like. Those skilled in the art would recognize the type of blend that is needed depends on the specific application or product for which the blend will be used. When used in such blended compositions, the copolymers described herein may comprise from about 1% to about 99% by weight of the polymer composition, or from about 1% to about 50% or from about 1% to about 25%, or from about 10% to about 90%, or from about 15% to about 95%, or from about 50% to about 99% or from about 75% to about 95%. The remainder of these compositions comprises one or more additional polymers, for example, poly α-olefins such as polyethylene or polypropylene, and optionally additives as described herein above.

Also provided are films comprising the copolymer or polymer compositions described herein. In one embodiment, the film is a monolayer film. In another embodiment the film is a multilayer film.

The extrusion-blown film process is a well-known process for the preparation of plastic film. The process employs an extruder which heats, melts and conveys the molten plastic and forces it through an annular die. Extrusion temperatures may range from about 330° F. (165° C.) to about 500° F. (260° C.), or from about 350° F. (175° C.) to about 460° F. (240° C.).

The film comprising ethylene copolymer is drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the transverse direction, by the use of forced air which "blows out" the diameter of the bubble, and in the lengthwise direction of the bubble, by the action of a winding element which pulls the bubble through the machinery. External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the drawdown rate.

The bubble is then collapsed immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the ethylene copolymer and by the processing conditions. For example, the processing conditions are thought to influence the degree of molecular orientation in both the machine direction and the transverse or cross direction.

A balance of machine direction ("MD") and transverse direction ("TD"—which is perpendicular to MD) molecular orientation is generally considered desirable for the films associated with some embodiments of the invention. For example, Dart Impact strength, Machine Direction and Transverse Direction tear properties may be affected.

Thus, it is recognized that these stretching forces on the bubble can affect the physical properties of the finished film. In particular, it is known that the blow up ratio (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a co-extrusion process that allows more than one stream of molten polymer to be introduced to an annular die resulting in a multi-layered film membrane or 2) a lamination process in which film layers are laminated together.

In some embodiments of the invention, the films are prepared using the above described blown film process.

An alternative process is the so-called cast film process, wherein the ethylene copolymer or polymer compositions made therefrom, is melted in an extruder, then forced through a linear slit die, thereby "casting" a thin flat film. The extrusion temperature for cast film may be somewhat hotter than that used in the blown film process, with operating temperatures ranging from about 400° F. (205° C.) to about 550° F. (290° C.). The cast film may be cooled (or quenched) more rapidly than blown film.

The above description relates to the preparation of monolayer cast films. Multilayer films may be prepared by 1) a co-extrusion process that allows more than one stream of molten polymer to be introduced to a linear slit die resulting in a multi-layered film membrane or 2) a lamination process in which film layers are laminated together.

In some embodiments, the films are prepared using a cast film process. In other embodiments, the films are prepared using the blown film processes. In some embodiments the films are prepared using a double bubble film blowing process. In some embodiments the films are prepared using a biaxial stretch film process. In some embodiments the films are prepared using a shrink film process. In some embodiments the multi-layer films are prepared wherein the film structure contains one or more layers comprising one or more of the ethylene copolymer compositions described above.

Also provided are packaging articles such as bags, pouches, cartons, bins, containers, and the like, comprising the ethylene copolymers described herein or polymer compositions made therefrom. In some embodiments the packaging articles include multilayer films comprising the copolymers described herein as the sealant layer and/or a toughness enhancing layer. In some embodiments, when the copolymers are used in the skin layer, they provide good hot tack and sealability characteristics as well as improved film toughness. In some embodiments, when the copolymers are used in any of the core layers of a multilayer film, they provide improved film toughness and puncture resistance.

In some embodiments, the ethylene copolymers described herein and polymer compositions made therefrom provide improved creep resistance and good resin processability in films, for example, in a monolayer film.

In some embodiments, the ethylene copolymers described herein and polymer compositions made therefrom provide improved film toughness and creep resistance in films, for example, in a monolayer film.

In some embodiments, the ethylene copolymers described herein and polymer compositions made therefrom provide improved film toughness and creep resistance in films, for example, in a monolayer film, or for example in multilayer film structures.

In some embodiments, the packaging articles are multilayer films comprising the copolymers or polymer compositions described herein as a component of a tie layer concentrate.

In some embodiments, the packaging articles include multilayer films or sheets comprising the copolymers or polymer compositions described herein for use in thermoformed packages for use in different packaging applications such as food packaging applications.

In some embodiments, the packaging articles include multilayer films or sheets comprising the copolymers or polymer compositions described herein for use in biaxial shrink packaging for use in different packaging applications including collation shrink.

In some embodiments, the copolymers or polymer compositions described herein blended with other ethylene polymers and copolymers such as high pressure LDPE, HDPE, LLDPE and the like may be used in one or more layers of the multilayer films or sheets.

In some embodiments, the ethylene copolymers described herein and polymer compositions made therefrom can be used to make plastic articles, including blow molded parts (such as tanks, drums and containers); extruded goods (such as profiles or hoses); and injection molded goods such as food containers. In some embodiments, plastic articles comprise 5 to 100% by weight of the polymer compositions described herein.

The present invention will further be described by reference to the following examples. Unless otherwise indicated, all percentages are by weight. The following examples are merely illustrative of the invention and are not intended to be limiting.

EXAMPLES

Ethylene copolymer compositions were produced with a single site catalyst in a dual reactor solution process using ethylene monomer and octene as a comonomer.

Polymer composition properties (resin and molecular characteristics) and film properties were measured using test methods described below.

Polymer density was determined in grams per cubic centimeter (g/cm$^3$) according to ASTM D792.

Melt index (MI), $I_2$, in g/10 min was determined on a Tinius Olsen Plastomer (Model MP993) in accordance with ASTM D1238 Procedure A (Manual Operation) at 190° C. with a 2.16 kilogram weight. Melt index, $I_{10}$, in g/10 min was determined in accordance with ASTM D1238 Procedure A at 190° C. with a 10 kilogram weight. Melt index, $I_6$, in g/10 min was determined in accordance with ASTM D1238 Procedure A at 190° C. with a 6.48 kilogram weight. High load melt index, $I_{21}$, in g/10 min was determined in accordance with ASTM D1238 Procedure A at 190° C. with a 21.6 kilogram weight. Melt flow ratio (MFR, also sometimes called melt index ratio) is $I_{21}/I_2$. Stress Exponent (S.Ex.) is log $(I_6/I_2)$/log $(6480/2160)$.

The melting behavior including a peak melting point ($T_m$), the number of peaks and the percent crystallinity of the copolymers are determined by using a TA Instrument DSC Q1000 Thermal Analyzer at a rate of 10° C./min compliant with ASTM D3418-12. In a DSC measurement, a heating-cooling-heating cycle from room temperature to 200° C. is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

The average molecular weights and the molecular weight distributions were determined using a Waters Model 150 Gel Permeation Chromatography (GPC) apparatus equipped with a differential refractive index detector. The co-monomer distribution of the resins was determined through GPC-FTIR.

$M_n$ is the number average molecular weight, $M_w$ is the weight average molecular weight and $M_z$ is the z-average molecular weight. The ratio of $M_w/M_n$ is a measure of the breadth of the molecular weight distribution of the polymer and this ratio is referred to as the polydispersity index. The ratio of $M_z/M_w$ is a measure of the breadth of the high molecular weight fraction of the polymer molecular weight distribution. The formulas to calculate $M_n$, $M_w$, and $M_z$ are provided in ASTM 6474-99.

The determination of branch frequency as a function of molecular weight (and hence the comonomer distribution) was carried out using high temperature Gel Permeation Chromatography (GPC) and FTIR of the eluent. Polyethylene standards with a known branch content, polystyrene and hydrocarbons with a known molecular weight were used for calibration.

To determine Composition Distribution Breadth Index, $CDBI_{50}$, a solubility distribution curve is first generated for the polyethylene composition. This is accomplished using data acquired from the Temperature Rising Elution Fractionation (TREF) technique. This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median.

The specific TREF method used herein was as follows. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (at the rate of 0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

Dynamic Mechanical Analysis (DMA) rheological measurements (e.g. small-strain (10%) oscillatory shear measurements) were carried out on a dynamic Rheometrics SR5 Stress rotational rheometer with 25 mm diameter parallel plates in a frequency sweep mode under full nitrogen blanketing. The polymer samples were appropriately stabilized with the anti-oxidant additives and then inserted into the test fixture for at least one minute preheating to ensure the normal force decreasing back to zero. DMA experiments are conducted at 10% strain, 0.05 to 100 rad/s and 190° C. Orchestrator Software was used to determine the viscoelastic parameters including the storage modulus (G') and loss modulus (G"). The values of storage modulus G' were estimated at a constant value of loss modulus G" at 500 Pa at 190° C. (G' at G"$_{(500\ Pa)}$). This is to characterize and discriminate the viscoelastic properties of the comparative and inventive copolymers. This test technique provides an opportunity to study the various characteristics of a polymer melt where the elastic and viscous modulus (G' and G"), viscosity ($\eta^*$), and tan δ as a function of dynamic oscillation (frequency) are generated to provide information on the rheological behavior in correlation with the molecular architecture.

Unsaturations in the ethylene copolymer composition were determined by Fourier Transform Infrared Spectroscopy (FTIR) as per ASTM D3124-98. A Thermo-Nicolet 750 Magna-IR Spectrophotometer equipped with OMNIC version 7.2a software was used for the measurements.

A variety of tests can be used to measure film quality. Some examples follow.

Dart impact strength was measured on a dart impact tester (Model D2085AB/P) made by Kayeness Inc. in accordance with ASTM D-1709-04 (Method A).

Machine (MD) and transverse (TD) direction Elmendorf tear strengths were measured on a ProTear™ Tear Tester made by Thwing-Albert Instrument Co. in accordance with ASTM D-1922.

Puncture resistance was measured on a MTS Systems Universal Tester (Model SMT (HIGH)-500N-192) in accordance with ASTM D-5748.

The tensile properties such as secant modulus (MD and TD) were measured on an Instrument 5-Head Universal Tester (Model TTC-102) at a crosshead speed of 0.2 in/min (0.508 cm/min) up to 10% strain in accordance with ASTM D-882-10. The 1% secant modulus (MD and TD) was determined by an initial slope of the stress-strain curve from an origin to 1% strain.

Percent of Creep is determined using a method developed in-house by NOVA Chemicals. This method determines the creep performance of a film sample under specified test conditions. The degree (or percent) of creep is dependent on the material, film orientation (machine direction, MD or transverse direction, TD), the tensile load, the temperature and the time a film is under stress. Deformation in lengthwise direction is recorded at specified time intervals and the % creep is calculated versus time. Results from this test method can be used: (1) to compare materials, (2) in the design of fabricated parts, and (3) to characterize and discriminate plastics for long-term performance under constant load.

Films were cut into 2.5 cm wide by 28 cm long strips, the length being in the machine direction (MD). In the middle of each specimen, using a ruler, a mark was created by drawing two lines 10 cm apart (Original Length). The top portion of the film sample strip was clamped onto a bar by placing the top of the film under a rubber clamp. The top mark (that was marked earlier for the 10 cm separation) was placed on the edge of the bar (for use of the edge as a reference point when measuring), then the clamp was locked. A total mass of 1 lbs (0.453 kg) for every 1 mil (25.4 microns) of film thickness was attached at the lower marked line on the film strip, clamped gently and then steadied. (For example, the total mass of 3 lbs (1.361 Kg) was attached for the 3 mil films, whereas the total mass of 6 lbs (2.722 Kg) was attached for the 6 mil films). The bottom section of the film with the weight was allowed to hang freely. Care was taken to ensure that the film sample strip was steady and free from moving around and twisting. The temperature was maintained at room temperature (23±2° C.) for the duration of the test. Original measurement of film length (10 cm) was recorded. Film lengths at the specified time intervals (t=0, 0.5, 1, 2, 4, 6, 24, and 48 hours) were recorded for each sample. From these data, Percent Creep was determined by the following formula:

$$\% \text{ Creep at time } (t) = 100 \times \frac{(\text{Measured Length at Time } (t) - \text{Original Length})}{(\text{Original Length})}$$

Comparative and Inventive Ethylene Copolymers

Exceed™ 1018HA and Enable™ 20-05HH are commercially available from ExxonMobil Chemical Company. MarFlex® D139 and Marlex® 7104 are commercially available from Chevron Phillips Chemical Company. mPE M 2710 EP is commercially available from Total Petrochemicals USA, Inc. Borstar® FB2310 is commercially available from Borealis. Evolue® SP3010 is commercially available from Prime Polymer Company. ELITE™ 5111, ELITE™ 5100G, and DOWLEX™ 2045G are commercially available from The Dow Chemical Company. SCLAIR® FP120-C is available commercially from NOVA Chemicals Corporation. It is an ethylene octene copolymer produced in a single reactor solution process using a Ziegler-Natta catalyst.

Preparation of inventive example ethylene copolymers, EX1, EX2, EX3 and EX4 was accomplished using a single site catalyst in a dual reactor solution process. The conditions and reagents employed are specified in Table 1.

TABLE 1

Pilot Plant Process Conditions
Table of Pilot Plant Process Conditions

| SAMPLE ID | EX1 | EX2 | EX3 | EX4 |
| --- | --- | --- | --- | --- |
| Total solution rate (kg/h) | 600 | 600 | 600 | 550 |
| Solution rate reactor 1 (kg/h) | 349 | 399 | 310 | 374 |
| Solution rate reactor 2 (kg/h) | 251 | 201 | 290 | 176 |
| Ethylene concentration in Reactor 1 (%) | 9.9 | 8.6 | 8.5 | 8.4 |
| Ethylene concentration Overall (%) | 12.8 | 12.7 | 12.5 | 13.6 |
| Ethylene Flow Percent Split: (Reactor 1/(Reactor 1 + Reactor 2)) * 100% (%) | 45 | 45 | 35 | 42 |
| Comonomer Flow Split Ratio: (Reactor 1/(Reactor 1 + Reactor 2)) | 1.0 | 1.00 | 1.00 | 1.0 |
| Comonomer/Ethylene ratio (wt./wt.) | 0.53 | 0.39 | 0.43 | 0.45 |
| Reactor 1 inlet temperature (° C.) | 30.0 | 30.0 | 30.0 | 30.0 |
| Reactor 2 inlet temperature (° C.) | 30.0 | 30.0 | 30.0 | 30.0 |
| Reactor 1 average temperature (° C.) | 137 | 135 | 130 | 130 |
| Reactor 2 average temperature (° C.) | 186 | 185 | 181 | 194 |
| Ethylene conversion reactor 1 (%) | 79 | 88 | 84.5 | 85.5 |
| Ethylene conversion reactor 2 (%) | 84.5 | 84.8 | 84.8 | 84.5 |
| Hydrogen in Reactor 1 (ppm) | 0.9 | 0.5 | 0.5 | 0.6 |
| Hydrogen in Reactor 2 (ppm) | 0.8 | 0.8 | 0.8 | 0.8 |
| Reactor 1 CAT A (ppm) | 0.14 | 0.30 | 0.24 | 0.27 |

TABLE 1-continued

Pilot Plant Process Conditions
Table of Pilot Plant Process Conditions

| SAMPLE ID | EX1 | EX2 | EX3 | EX4 |
|---|---|---|---|---|
| Reactor 1 CAT B:CAT A RATIO (mol/mol) | 100 | 100 | 100 | 100 |
| Reactor 1 CAT C:CAT B RATIO (mol/mol) | 0.30 | 0.30 | 0.30 | 0.30 |
| Reactor 1 CAT D:CAT A RATIO (mol/mol) | 1.20 | 1.20 | 1.20 | 1.20 |
| Reactor 2 CAT A (ppm) | 0.28 | 0.13 | 0.22 | 0.33 |
| Reactor 2 CAT B:CAT A RATIO (mol/mol) | 25 | 25 | 25 | 25 |
| Reactor 2 CAT C:CAT B RATIO (mol/mol) | 0.30 | 0.30 | 0.30 | 0.30 |
| Reactor 2 CAT D:CAT A RATIO (mol/mol) | 1.27 | 1.27 | 1.27 | 1.27 |
| Polymer Production Rate (kg/h) | 86.0 | 84.2 | 82.1 | 81.1 |
| R1 Agitator speed (rpm) | 325 | 325 | 325 | 325 |
| R2 Agitator speed (rpm) | 400 | 400 | 400 | 400 |
| Antioxidant 1 (ppm) | 529 | 544 | 587 | 566 |
| Antioxidant 2 (ppm) | 510 | 490 | 576 | 546 |

CAT A: Catalyst component A = cyclopentadienyltitanium(tri-tert-butylphosphinimine) dichloride
CAT B: Catalyst component B = Methylalumoxane (or "MAO"), "MMAO-7" from Akzo-Nobel
CAT C: Catalyst component C = 2,6-di-tert-butyl-4-ethyl-phenol
CAT D: Catalyst component D = tetrakis(pentafluorophenyl)borate
Antioxidant 1 = Irganox 1076 commercially available from BASF Corporation
Antioxidant 2 = Irgafos 168 commercially available from BASF Corporation Polymer properties of comparative and inventive copolymers were measured as described above and are reported in Table 2 and Table 3, respectively. The melt index and density values of resins in Table 2 are from product datasheets of respective resin grades published by their manufacturers.

TABLE 2

Resin and Molecular Characteristics of Comparative Examples

| | Resin Name | | | | | |
|---|---|---|---|---|---|---|
| | Exceed 1018HA | Marflex D139 | mPE M 2710 EP | Enable 20-05HH | Marlex 7104 | Borstar FB2310 |
| | Manufacturer | | | | | |
| | Exxon Mobil | Chevron Phillips | Total | Exxon Mobil | Chevron Phillips | Borealis |
| Density (g/cm$^3$) | 0.918 | 0.918 | 0.927 | 0.920 | 0.919 | 0.931 |
| Melt Index, I$_2$ (g/10 min) | 1.0 | 1.0 | 0.90 | 0.50 | 0.35 | 0.2 |
| Melt Flow Ratio (I$_{21}$/I$_2$) | 15.7 | 16.2 | 25.9 | 39.6 | 39.7 | 74 |
| Stress Exponent, S. Ex. | 1.11 | 1.12 | 1.34 | 1.56 | 1.5 | 1.66 |
| M$_w$/M$_n$ | 1.82 | 2.01 | 2.09 | 2.74 | 3.1 | 9.92 |
| M$_z$/M$_w$ | 1.66 | 1.67 | 1.7 | 1.9 | 2.54 | 4.99 |
| G' at G" $_{(500\ Pa)}$ at 190° C. (Pa) | 10 | 15 | | 143 | 208 | 133 |
| CDBI$_{50}$ | 71.9 | 70.8 | | 88 | 23.5 | |
| Number of peaks in DSC | 2 | 2 | 1 | 1 | 1 | 1 |
| Comonomer distribution | Reverse | Reverse | Flat | | Normal | Reverse |
| | Resin Name | | | | | |
| | Evolue SP3010 | ELITE 5111 | ELITE 5100G | NOVAPOL TF-0119-F | DOWLEX 2045G | SCLAIR FP120-C |
| | Manufacturer | | | | | |
| | Prime Polymer | Dow | Dow | NOVA | Dow | NOVA |
| Density (g/cm$^3$) | 0.926 | 0.925 | 0.920 | 0.918 | 0.920 | 0.920 |
| Melt Index, I$_2$ (g/10 min) | 0.80 | 0.85 | 0.85 | 1.0 | 1.0 | 1.0 |
| Melt Flow Ratio (I$_{21}$/I$_2$) | 30.5 | 31.7 | 29.6 | 27.8 | 28.2 | 29.6 |
| Stress Exponent, S. Ex. | 1.35 | 1.36 | 1.34 | 1.3 | 1.31 | 1.33 |
| M$_w$/M$_n$ | 4.09 | 3.25 | 3.05 | 3.28 | 3.52 | 3.34 |
| M$_z$/M$_w$ | 3.46 | 2.14 | 2.15 | 2.64 | 2.61 | 2.66 |
| G' at G" $_{(500\ Pa)}$ at 190° C. (Pa) | 114 | 100 | 81 | 46 | 43 | 46 |
| CDBI$_{50}$ | 38.7 | 44.9 | 25.3 | 29.8 | 54 | 57.3 |
| Number of peaks in DSC | 1 | 2 | 2 | 1 | 3 | 2 |
| Comonomer distribution | Reverse | Reverse | Reverse | Normal | Normal | Normal |

TABLE 3

Resin and Molecular Characteristics of Inventive Ethylene Copolymers

| | Name | | | |
|---|---|---|---|---|
| | EX1 | EX2 | EX3 | EX4 |
| Density (g/cm$^3$) | 0.9196 | 0.9198 | 0.9194 | 0.9204 |
| Melt Index I$_2$ (g/10 min) | 0.85 | 0.87 | 0.79 | 0.79 |
| Melt Flow Ratio (I$_{21}$/I$_2$) | 26.8 | 23.8 | 22.5 | 32.3 |
| Stress Exponent (S. Ex.) | 1.27 | 1.25 | 1.23 | 1.32 |
| M$_n$ (Da) | 39081 | 40635 | 47293 | 42030 |
| M$_w$/M$_n$ | 2.79 | 2.70 | 2.35 | 2.72 |
| M$_z$/M$_w$ | 2.36 | 2.26 | 2.09 | 2.49 |
| G' at G''$_{(500\ Pa)}$ at 190° C. (Pa) | 26 | 28 | 24 | 30 |
| Internal Unsaturation/100 C. | 0.015 | 0.014 | 0.012 | 0.017 |
| Side Chain Unsaturation/100 C. | 0.001 | 0.001 | 0.001 | 0.002 |
| Terminal Unsaturation/100 C. | 0.006 | 0.005 | 0.005 | 0.008 |
| Total unsaturation/chain | 0.6 | 0.6 | 0.6 | 0.8 |
| CDBI$_{50}$ | 85.4 | 83.1 | 73.2 | 90 |
| Number of peaks in DSC | 1 | 1 | 1 | 1 |
| Comonomer distribution | Flat | Reverse | Reverse | Reverse |

It can be seen that Exceed 1018HA, MarFlex D139, mPE M 2710 EP and Enable 20-05HH have M$_z$/M$_w$ below 2. Whereas, the inventive examples (EX1, EX2, EX3, and EX4) have M$_z$/M$_w$ greater than 2 indicating different molecular architecture in contrast to the comparative copolymers.

It can be seen that Marlex 7104, Borstar FB2310, Evolue SP3010, ELITE 5111 and ELITE 5100G have G' at G''$_{(500\ Pa)}$ at 190° C. value much greater than 40 Pa. Whereas, the inventive examples (EX1, EX2, EX3, and EX4) have G' at G''$_{(500\ Pa)}$ at 190° C. value less than 40 Pa.

It can be seen that NOVAPOL TF-0119-F, DOWLEX 2045G and SCLAIR FP120-C have G' at G''$_{(500\ Pa)}$ at 190° C. value greater than 40 Pa. DOWLEX 2045G and SCLAIR FP120-C also have 2 or more peaks in their DSC profiles (FIGS. 1 and 2, respectively), and also has a CDBI$_{50}$ of less than 60. Whereas, the inventive examples (EX1, EX2, EX3, and EX4) have G' at G''$_{(500\ Pa)}$ at 190° C. values less than 40 Pa, only one peak in their DSC profiles (FIGS. 3, 4, 5 and 6, respectively) and a CDBI$_{50}$ of greater than 60.

The films of some examples were made on a blown film line manufactured by Battenfeld Gloucester Engineering Company of Gloucester, Mass. using a die diameter of 4 inches (101.6 mm), and a die gap of 35 mil (0.889 mm). A fluoroelastomer type polymer processing aid (PPA) via Ingenia 1150 Process Aid Masterbatch (commercially available from Ingenia Polymers) was added at a loading of 1.5 weight % to EX1, EX2, EX3, and EX4 for purposes of film production. SCLAIR FP120-C contains a PPA and was used as received. This blown film line has a standard output of about 100 pounds per hour (45.4 kg/h). Screw speed is in the range of 30 to 50 RPM. The extruder screw (barrier screw) has a 2.5 inches (63.5 mm) diameter and a length/diameter (L/D) ratio of 24/1. Melt Temperature and Frost Line Height (FLH) are in the range of 420 to 440° F. (215 to 227° C.) and 15-18 inches (0.381 to 0.457 m), respectively. The blown film bubble is air cooled. Typical blow up ratio (BUR) for blown films prepared on this line are from 2:1 to 4:1. An annular die having a gap of 35 mils (0.889 mm) was used for these experiments. The films of these examples were prepared using a BUR aiming point of 2.0:1 and a film thickness aiming points of 3 mil (76.2 microns) and 6 mil (152.4 microns). The blown film line processing conditions are reported in Table 4. Film properties for the 3 mil and 6 mil films were measured as described above and are reported in Table 5 and Table 6, respectively.

TABLE 4

Monolayer Blown Film Line Conditions

| Processability Parameter | FP120-C | EX1 | EX2 | EX3 | EX4 |
|---|---|---|---|---|---|
| Die Gap (mil) | 35 | 35 | 35 | 35 | 35 |
| Output (lbs/hr) | 100 | 100 | 100 | 100 | 100 |
| Average Back Pressure (psig) | 3750 | 4125 | 4227 | 4212 | 3990 |
| Average Current (Amps) | 37.6 | 40 | 41.7 | 41.5 | 39 |
| Screw RPM | 39 | 42 | 42 | 41 | 42 |
| Average Melt Temperature (° F.) | 427 | 428 | 429 | 428 | 429 |

As seen in Table 4, example inventive copolymers, EX1, EX2, EX3 and EX4 processed relatively similar to the comparative resin (FP120-C).

TABLE 5

Physical Properties of 3 mil Films Made From Comparative and Inventive Compositions

| | Name | | | | |
|---|---|---|---|---|---|
| | FP120-C | EX1 | EX2 | EX3 | EX4 |
| Nominal film thickness (mil) | 3 | 3 | 3 | 3 | 3 |
| Dart impact strength (g/mil) | 215 | 275 | 277 | 327 | 269 |
| Tear strength - MD (g/mil) | 411 | 351 | 335 | 348 | 315 |
| Tear strength - TD (g/mil) | 565 | 458 | 438 | 414 | 443 |
| MD/TD tear ratio | 0.73 | 0.77 | 0.76 | 0.84 | 0.71 |
| Puncture Resistance (J/mm) | 76 | 57 | 106 | 95 | 93 |
| 1% Secant Modulus - MD (MPa) | 194 | 200 | 206 | 213 | 205 |
| 1% Secant Modulus - TD (MPa) | 233 | 243 | 235 | 240 | 240 |

TABLE 6

Physical Properties of 6 mil Films Made From Comparative and Inventive Compositions

| | Name | | | | |
|---|---|---|---|---|---|
| | FP120-C | EX1 | EX2 | EX3 | EX4 |
| Nominal film thickness (mil) | 6 | 6 | 6 | 6 | 6 |
| Dart impact strength (g/mil) | 221 | 261 | 295 | 323 | 265 |
| Tear strength - MD (g/mil) | 449 | 402 | 366 | 387 | 370 |
| Tear strength - TD (g/mil) | 538 | 432 | 433 | 409 | 412 |
| MD/TD tear ratio | 0.83 | 0.93 | 0.85 | 0.95 | 0.90 |
| Puncture Resistance (J/mm) | 66 | 52 | 81 | 86 | 63 |
| 1% Secant Modulus - MD (MPa) | 215 | 219 | 226 | 231 | 217 |
| 1% Secant Modulus - TD (MPa) | 236 | 239 | 232 | 242 | 238 |

It is seen from both Table 5 and Table 6 that films made from the inventive examples EX1, EX2, EX3 and EX4 all have improved film toughness-stiffness balance in comparison to films made from FP120-C (comparative). The improved toughness is indicated by higher dart impact strength values. The improved stiffness is indicated by higher 1% secant modulus values in MD. Films made from the inventive examples EX2, EX3 and EX4 also have improved puncture resistance compared to films made from FP120-C under some experimental conditions.

Table 7 provides the creep performance of 3 mil films made from the inventive examples EX1 and EX3 and the comparative polymer composition FP120-C. Table 8 provides the creep performance of 6 mil films made from the inventive examples EX2 and EX4 and the comparative polymer composition FP120-C.

TABLE 7

Percent Creep of 3 mil Films Made From Comparative and Inventive Compositions

| | Name | | |
|---|---|---|---|
| Time (hours) | FP120-C (% creep) | EX1 (% creep) | EX3 (% creep) |
| Before weight is applied | 0 | 0 | 0 |
| 0 | 3 | 4 | 5 |
| 0.5 | 14 | 15 | 14 |
| 1 | 17 | 16 | 17 |
| 2 | 20 | 18 | 19 |
| 4 | 23 | 20 | 20 |
| 6 | 25 | 21 | 22 |
| 24 | 30 | 25 | 26 |
| 48 | 31 | 26 | 26 |

TABLE 8

Percent Creep of 6 mil Films Made From Comparative and Inventive Compositions

| | Name | | |
|---|---|---|---|
| Time (hours) | FP120-C (% creep) | EX2 (% creep) | EX4 (% creep) |
| Before weight is applied | 0 | 0 | 0 |
| 0 | 4 | 4 | 5 |

TABLE 8-continued

Percent Creep of 6 mil Films Made From Comparative and Inventive Compositions

| | Name | | |
|---|---|---|---|
| Time (hours) | FP120-C (% creep) | EX2 (% creep) | EX4 (% creep) |
| 0.5 | 15 | 12 | 12 |
| 1 | 18 | 13 | 13 |
| 2 | 21 | 15 | 16 |
| 4 | 25 | 17 | 18 |
| 6 | 28 | 19 | 21 |
| 24 | 33 | 23 | 25 |
| 48 | 36 | 25 | 27 |

It is seen from Table 7 that the 3 mil (76.2 micron) films made from inventive examples ethylene copolymers EX1 and EX3 have about 16% lower creep after 48 h under experimental conditions than the 3 mil (76.2 micron) film made from comparative example composition FP120-C.

It is seen from Table 8 that the 6 mil (152.4 micron) films made from inventive examples ethylene copolymers EX2 and EX4 have about 30% and 25%, respectively, lower creep than the 6 mil (152.4 micron) film made from comparative example composition FP120-C.

The present invention has been described with reference to certain details of particular embodiments thereof. It is not intended that such details be regarded as limitations upon the scope of the invention except insofar as and to the extent that they are included in the accompanying claims.

INDUSTRIAL APPLICABILITY

The present disclosure relates to ethylene copolymers, copolymer compositions and methods of making and using the same.

The invention claimed is:

1. An ethylene copolymer having
   a) a density from about 0.918 g/cm$^3$ to about 0.935 g/cm$^3$,
   b) G' at G''$_{(500\ Pa)}$ value, as determined from Dynamic Mechanical Analysis at 190° C., of less than 40 Pa,
   c) a molecular weight distribution $M_z/M_w$ of greater than 2, provided that when the $M_z/M_w$ is greater than 2 but less than 3, the copolymer has a flat to reverse comonomer distribution and further provided that when the $M_z/M_w$ is greater than 3, the copolymer has a flat comonomer distribution;
   d) a CDBI$_{50}$ greater than 70; and
   e) a single peak in the DSC measurement.

2. The ethylene copolymer of claim 1, wherein the molecular weight distribution $M_z/M_w$ is greater than 2 to but less than 3.

3. The ethylene copolymer of claim 1, wherein melt index, I$_2$ is from about 0.4 g/10 min to about 10 g/10 min.

4. The ethylene copolymer of claim 1, wherein melt index, I$_2$ is from about 0.4 g/10 min to about 5 g/10 min.

5. The ethylene copolymer of claim 1, wherein melt index, I$_2$ is from about 5 g/10 min to about 10 g/10 min.

6. The ethylene copolymer of claim 1, wherein the density is from about 0.919 g/cm$^3$ to about 0.927 g/cm$^3$.

7. The ethylene copolymer of claim 1, wherein the G' at G''$_{(500\ Pa)}$ at 190° C. value is less than 30 Pa.

8. The ethylene copolymer of claim 1, wherein $M_z/M_w$ is greater than 2.0 and less than about 2.5.

9. The ethylene copolymer of claim 1, wherein $M_z/M_w$ is from about 2.1 to about 2.8.

10. The ethylene copolymer of claim 1, wherein $M_z/M_w$ is from greater than 3 and less than about 6.

11. The ethylene copolymer of claim 1, wherein the $CDBI_{50}$ is greater than 70 and less than about 95.

12. The ethylene copolymer of claim 1, wherein $M_w/M_n$ is from about 2.1 to about 5.5.

13. The ethylene copolymer of claim 1, wherein the copolymer is made from ethylene and one or more $C_3$-$C_{12}$ alpha olefin.

14. The ethylene copolymer of claim 1, wherein the copolymer is made from ethylene and one or more $C_3$-12 alpha olefin comonomers in a continuous polymerization process.

15. The ethylene copolymer of claim 14, wherein the continuous solution polymerization process comprises at least two polymerization reactors.

16. The ethylene copolymer of claim 15, wherein the copolymer is made from ethylene and one or more $C_{3-12}$ alpha olefin comonomers in a polymerization process using at least one single site catalyst.

17. The ethylene copolymer of claim 16 wherein the single-site catalyst is selected from a catalyst of the formula:

wherein
M is a group 4 metal;
PI is a phosphinimine ligand;
L is a monoanionic ligand selected from the group consisting of a cyclopentadienyl type ligand;
Y is an activatable ligand;
m is 1 or 2;
n is 0 or 1; and
p is an integer and the sum of m+n+p equals the valence state of M.

18. A polymer composition comprising the ethylene copolymer of claim 17.

19. The ethylene copolymer of claim 14, wherein the continuous solution polymerization process comprises
a) a first stirred tank polymerization reactor having a mean reactor temperature of from about 100° C. to less than 140° C., and,
b) a second stirred tank reactor having a mean temperature of at least about 20° C. greater than the mean reactor temperature of the first reactor.

20. A polymer composition comprising the ethylene copolymer of claim 14.

21. A polymer composition comprising the ethylene copolymer of claim 1.

22. The polymer composition of claim 21, wherein the polymer composition has an average total unsaturation per chain in the range of 0.2 to less than 2.

23. An article comprising 5 to 100% of the polymer composition of claim 21.

24. A monolayer film comprising polymer composition of claim 21.

25. A multilayer film, containing at least one layer comprising the polymer composition of claim 21.

26. A packaging article comprising the polymer composition of claim 21.

27. A blend polymer composition comprising the ethylene copolymer of claim 1 blended with one or more of LDPE, LLDPE, HDPE, VLDPE, or ULDPE.

28. The polymer composition of claim 27, wherein the polymer composition has an average total unsaturation per chain in the range of 0.2 to less than 2.

* * * * *